United States Patent
Thome et al.

(10) Patent No.: US 6,656,276 B1
(45) Date of Patent: Dec. 2, 2003

(54) DEVICE FOR SPRAYING A COATING PRODUCT COMPRISING AT LEAST A SPRAYER AND A PISTON RESERVOIR

(75) Inventors: Caryl Thome, Saint Egreve (FR); Philippe Provenaz, Grenoble (FR); Louis Sentis, Grenoble (FR)

(73) Assignee: Sames Technologies, Meylan (FR)

( * ) Notice: Subject to any disclaimer, the term of this patent is extended or adjusted under 35 U.S.C. 154(b) by 78 days.

(21) Appl. No.: 10/069,759

(22) PCT Filed: Aug. 11, 2000

(86) PCT No.: PCT/FR00/02315

§ 371 (c)(1),
(2), (4) Date: Feb. 28, 2002

(87) PCT Pub. No.: WO01/15816

PCT Pub. Date: Mar. 8, 2001

(30) Foreign Application Priority Data

Aug. 30, 1999 (FR) ............................................. 99 10994

(51) Int. Cl.$^7$ ............................................... B05B 15/02
(52) U.S. Cl. ........................ 118/302; 239/323; 239/329; 239/106
(58) Field of Search .......................... 118/302; 239/320, 239/321, 322, 323, 329, 305, 104, 105, 106, 602, 533.13, 546, 591; 222/322, 372, 383.1, 383.3, 384

(56) References Cited

U.S. PATENT DOCUMENTS

| | | | | |
|---|---|---|---|---|
| 5,292,036 A | * | 3/1994 | Thome | 222/333 |
| 5,733,597 A | * | 3/1998 | Schmitkons et al. | 427/96 |
| 6,338,441 B1 | * | 1/2002 | Umezawa et al. | 239/329 |
| 6,349,884 B1 | * | 2/2002 | Thome et al. | 239/1 |

* cited by examiner

Primary Examiner—Richard Crispino
Assistant Examiner—Yewebdar T. Tadesse
(74) Attorney, Agent, or Firm—Browdy and Neimark

(57) ABSTRACT

The invention concerns a reservoir capable of being periodically cleaned and/or filled with a coating product equipped with a piston (10) controlled in its movement by a control rod (11). A module (32) elastically deformable in compression (F) is incorporated in the kinematic linkage (20) between the rod (11) and the piston (10) or between the rod (11) and its actuating means, thereby providing elasticity for positioning the piston against the base of the reservoir, which enables a slight displacement of the piston rearwards when the cleaning product or fresh coating product is being injected.

10 Claims, 2 Drawing Sheets

Figure 1:
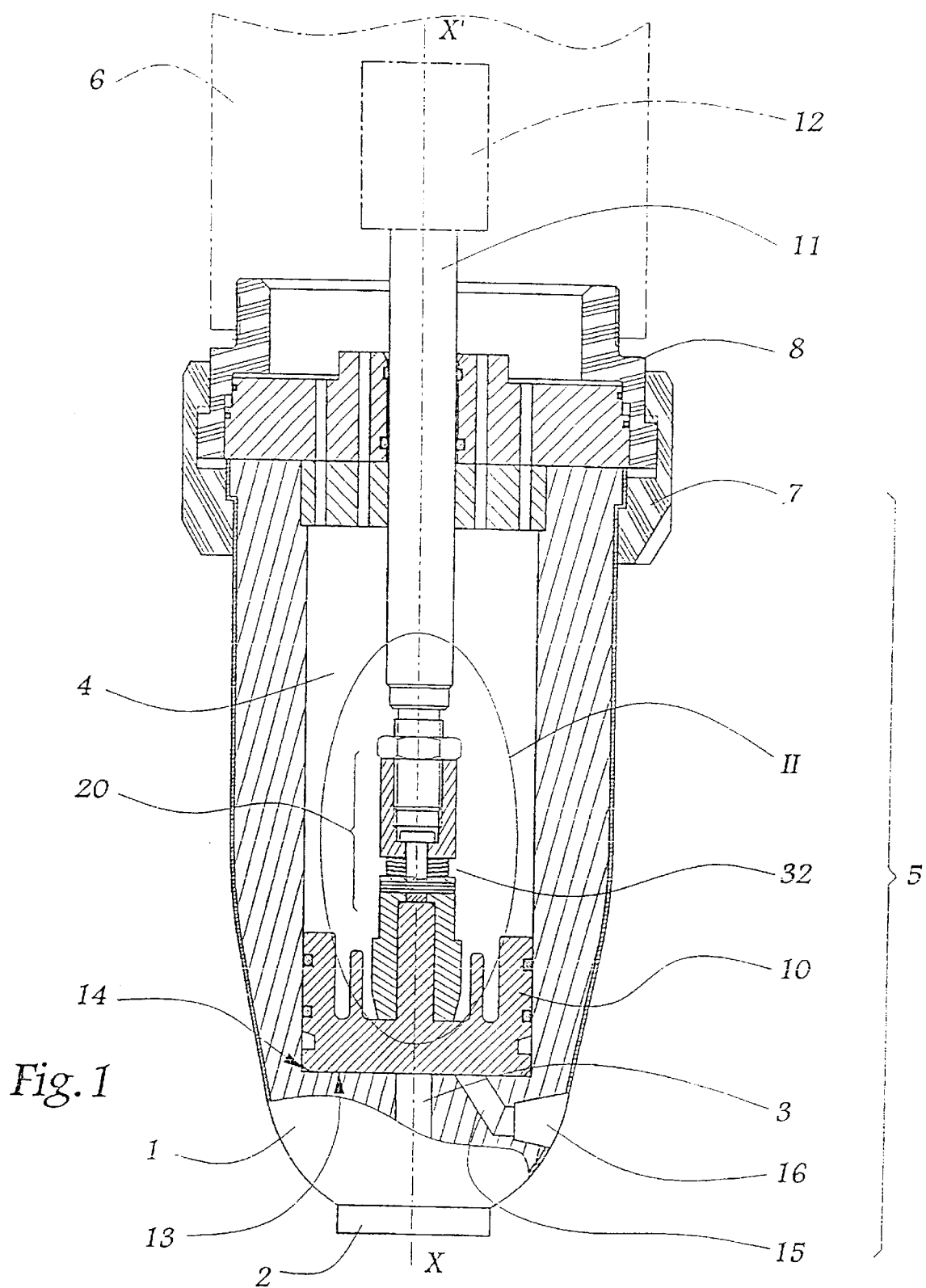

DEVICE FOR SPRAYING A COATING PRODUCT COMPRISING AT LEAST A SPRAYER AND A PISTON RESERVOIR

The present invention relates to a device for projecting coating product, comprising at least one sprayer and a reservoir with piston.

It is known to use coating product sprayers borne on robots or automats, these sprayers being displaced opposite the objects to be coated. For certain applications, and particularly for hydrosoluble coating products, it is known, in particular from EP-A-0 274 322, to carry a reservoir of coating product at the end of the arm of a robot to supply one or more sprayers. When almost all the product contained in the reservoir has been consumed, it is necessary to clean this reservoir and to refill it.

The reservoir may include a piston whose displacement allows the coating product to be driven towards the sprayer.

The precision obtained for the flowrate of coating product during projection essentially depends on the precision of the displacement control of the piston inside the reservoir. Systems comprising a piston controlled by a rod are more precise than pneumatically or hydraulically controlled systems which necessarily comprise a pressure regulator constituting a dead volume which must be cleaned and leads to losses of coating product.

When the coating product contained in the reservoir has been used up, the piston is in the immediate proximity of the bottom of the reservoir since the main part of the product has been consumed. If the piston is applied against this bottom, to bleed the remaining coating product, the introduction of a cleaning product in the reservoir tangentially to the front face of the piston is no longer possible, with the result that this front face remains soiled by the coating product used previously. If the piston is not applied against the bottom of the reservoir in order to allow an eddying movement of the cleaning product, a corresponding volume of coating product is lost during each cleaning/filling operation, which increases the exploitation costs of the installation accordingly. In addition, part of the cleaning product is used only for evacuating this remaining coating product and not for effectively cleaning the front face of the piston, which corresponds to additional costs.

French Patent Application 2 722 432 discloses using a rod capable of being mechanically disconnected from the piston or from its means for driving in translation during cleaning or filling of the reservoir, which allows a movement of recoil of the front face of the piston during the introduction of a cleaning product under pressure. This solution is advantageous but requires elaborate drive means which include a position control system in order to allow a recoil, with a short but precisely controlled stroke, of these means with respect to the piston.

It is an object of the invention to propose an alternative solution to the problems set forth hereinabove, which does not require mechanical disconnection of the piston from its drive means.

To that end, the invention relates to a device for spraying coating product, comprising at least one sprayer and a piston reservoir, the displacement of the piston being controlled by an actuating rod, while the bottom of the reservoir is connected by at least one channel to a supply of cleaning product and/or of fresh product, characterized in that it comprises a module, elastically deformable in compression, incorporated in the kinematic linkage between the rod and the piston or between the rod and its drive means, this module allowing a movement of recoil of the piston during the introduction of the product in the reservoir from said channel and in the direction of the front face of the piston.

Thanks to the invention, a certain "elasticity" is given to the positioning of the piston when it is in abutment against the bottom of the reservoir, this elasticity being able to be advantageously used for creating a space for circulation of cleaning product, of which the pressure of injection in the reservoir allows the deformable elastic module to be compressed. In other words, the piston is capable of a slight clearance which clears a space for circulation of the cleaning product. In addition, the device of the invention makes it possible to dampen a possible excess pressure while the reservoir is being filled with fresh cleaning product.

According to advantageous aspects of the invention, the device incorporates one or more of the following features:

- The module is incorporated in an assembly intended to be disposed between one end of the rod and the rear face of the piston. In that case, this assembly advantageously comprises a first element for receiving the end of the rod and a second element adapted to cooperate with the rear face of the piston, the elastically deformable module being disposed between these first and second elements. These first and second elements may be provided to be connected by a mechanical linkage with clearance which may be formed by a rod provided with a head received with clearance in a housing of one of the elements mentioned above and fast with the other element.
- The elastically deformable module is formed by a stack of Belleville washers. In that case, said washers may be provided to be arranged between the first and second elements mentioned above, around the said rod.
- The elastically deformable module may also be formed by a block of material which is elastically deformable in compression, such as an elastomer. Other materials may, of course, be envisaged.
- The constant of stiffness of the elastically deformable module is sufficient for it to be rigid during the spraying phases. This allows a precise control of the flowrate of product during spraying.

Figure 2:
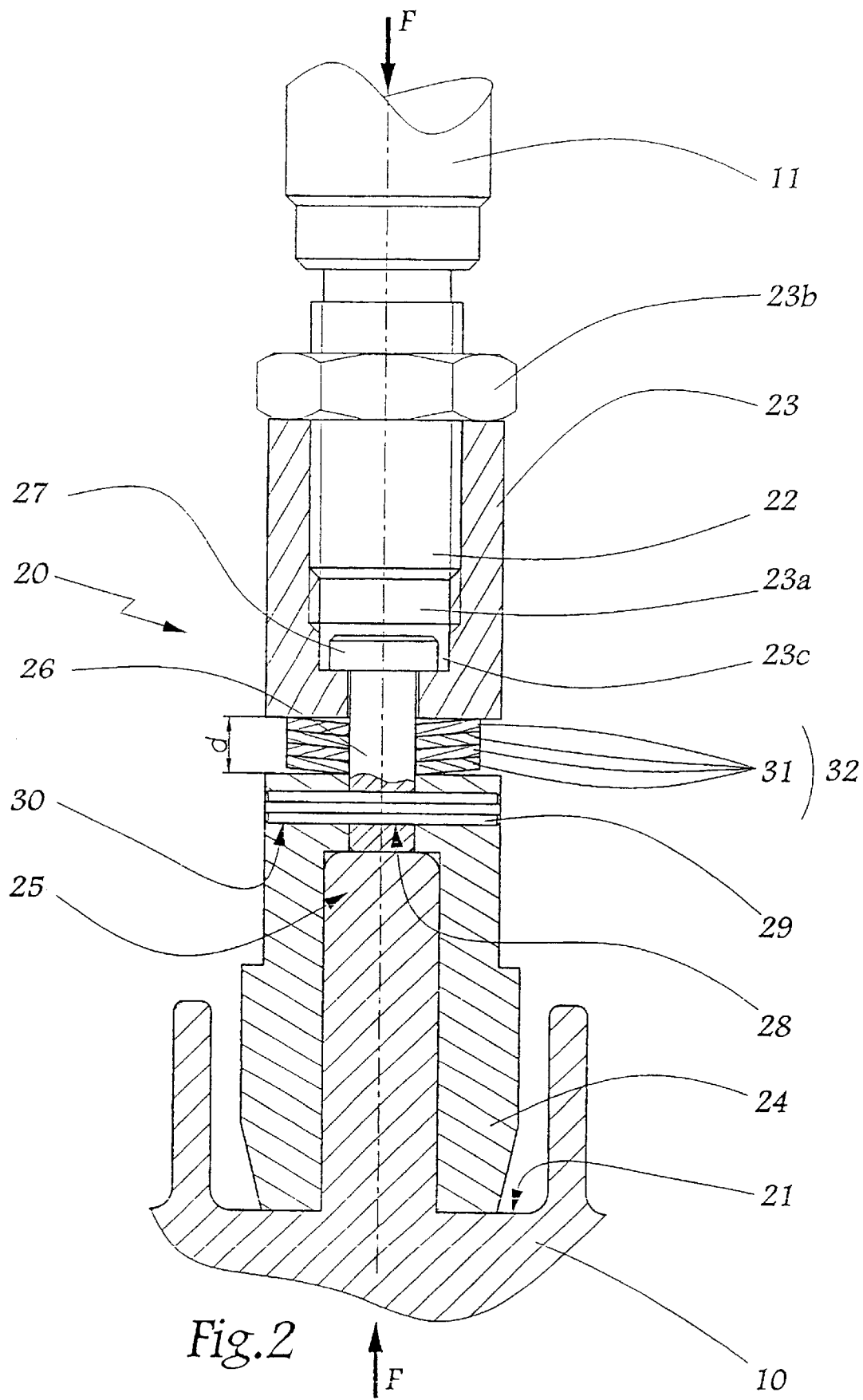

The invention will be more readily understood and other advantages thereof will appear more clearly on reading the following description of an embodiment of a coating product sprayer device in accordance with its principle, given solely by way of example with reference to the accompanying drawings, in which:

FIG. 1 is a longitudinal section through a device according to the invention, and FIG. 2 is a view on a larger scale of detail II in FIG. 1.

The device of FIG. 1 is intended to be mounted at the end of the arm of the robot. It comprises a rotary sprayer 1 for spraying coating product, provided with a sprayer bowl 2 driven in rotation by the rotor of an air turbine (not shown).

The sprayer 1 is supplied with coating product via a conduit 3 connected to a reservoir 4. The sprayer 1 and the reservoir 4 are incorporated in a sub-assembly 5 provided to be mounted at the end 6 of the arm of a multi-axis robot (not shown), thanks to a ring 7 cooperating with a support 8 mounted on the end 6.

A piston 10 is provided to push the coating product contained in the reservoir 4 towards the conduit 3 during the phases of use of the sprayer 1. Displacement of the piston 10 is controlled by a rod 11 driven in translation along a central axis XX' of the device thanks to an actuator 12 which may be of any known type, for example an electric or pneumatic jack or a step-by-step motor.

At the end of a coating operation, i.e. when most of the product contained in the reservoir 4 has been consumed, the sub-assembly 5 is directed towards a cleaning/filling station where the reservoir 4 is bled by displacing the piston 10 until the front face 13 comes into abutment against the bottom 14 of the reservoir 4 in which the inlet orifice of the conduit 3 is made.

The bottom 14 is also pierced with an outlet orifice of a channel 15 connected to a valve 16 provided to be connected to a supply of cleaning product and/or of fresh coating product.

In the configuration shown in FIG. 1 where the piston 10 is applied against the bottom 14, a cleaning product may be injected under pressure inside the reservoir 4 via the channel 15, sweeping the front face 13 of the piston 10 thanks to the elasticity obtained by a device more particularly visible in FIG. 2.

This device comprises a connector 20 provided to be interposed between the rear face 21 of the piston 10 and the front end 22 of the rod 11. This connector comprises a sleeve 23 whose central bore 23a is tapped while the end 22 is threaded with a pitch identical to that of sleeve 23, this end therefore being adapted to be screwed in this sleeve and immobilized thanks to a nut 23b.

The connector 20 also comprises a second sleeve 24 provided to cover a central projection 25 of the rear face 21 of the piston 10, a relative immobilization of parts 10 and 24 being obtained by cooperation of shapes. The shape of elements 24 and 25 promotes guiding of piston 10 in translation.

Other geometries may be provided for elements 23 and 24 which are respectively adapted to rod 11 and to piston 10. In particular, the sleeve 24 may be replaced by a rod-shaped element in abutment by a planar contact on the face 21.

Sleeves 23 and 24 are connected thanks to a pin 26 provided with a head 27 received in the bottom part 23c of the bore 23a not occupied by the end 22. On the side opposite its head 27, the pin 26 is pierced with an orifice 28 for passage of an elastic pin 29 also traversing a transverse bore 30 in the sleeve 24.

Around pin 26 and between the sleeves 23 and 24 there are arranged four Belleville washers 31 forming a stack 32 capable of being deformed in compression, with the result that the distance d between the opposite surfaces of the sleeves 23 and 24 may be reduced under the effect of an effort of compression represented by arrows F in FIG. 2.

In this way, during the introduction of the cleaning product under pressure into the reservoir 4 against the front face 13 of the piston 10, the piston recoils by a stroke corresponding to the reduction of the distance d due to the elastically deformable nature of the stack 32.

This allows the front face 13 to be cleaned under the effect of the eddying flow of the cleaning product. When this cleaning is terminated, the rod 11 is displaced by the actuator 12 so as to retract the piston 10 while the reservoir 4 is filled with fresh coating product.

The sprayer 1 may then be supplied by displacing the piston 10 by means of the rod 11 towards the bottom 14 of the reservoir 4. During the spraying operations, the pressure prevailing in the reservoir 4 is substantially less than the pressure of injection of the coating product and the rigidity of the stack 32 is chosen to be sufficient for this stack to be rigid when it is subjected to the pressure prevailing in the reservoir during the spraying phases. In other words, the drive of the piston 10 thanks to rod 11 is precise during the spraying phases as the stack 32 is rigid under these conditions.

On the other hand, in the event of over-pressure during injection of cleaning product or of fresh coating product, the stack 31 may serve as buffer between the piston 10 and the rod 11, which makes it possible to limit the risks of accidental damage to the actuator 12.

According to a variant of the invention (not shown), the Belleville washers 31 may be replaced by a block of elastically deformable material, such as a block of elastomer and more generally a block of plastics material or of any other suitable material.

According to another variant of the invention (not shown), the elastically deformable module constituted by the stack 32 or a block of elastomer may be disposed at the end opposite end 22, i.e. between the rod 11 and the actuator 12.

The invention has been shown with a coating product sprayer of the rotary type. However, it is also applicable with any type of sprayer, rotary or not, electrostatic or not.

The invention has been shown with a reservoir supplied with cleaning product and fresh coating product via one channel. It would be applicable with two or more than two channels used for such supply.

What is claimed is:

1. Device for spraying coating product, comprising at least one sprayer (1) and a reservoir (4) provided with a piston (10), the displacement of said piston being controlled by an actuating rod (11), while the bottom (14) of said reservoir is connected by at least one channel (15) to a supply (16) of cleaning product and/or of fresh product, characterized in that it comprises a module (32), elastically deformable in compression (F), incorporated in the kinematic linkage (20) between said rod and said piston or between said rod and its drive means (12), said module allowing a movement of recoil of said piston during the introduction of product in said reservoir from said channel (15) and in the direction of the front face (13) of said piston.

2. Device according to claim 1, characterized in that said module (32) is incorporated in an assembly (20) intended to be disposed between one end (22) of said rod (11) and the rear face (21) of said piston (10).

3. Device according to claim 2, characterized in that said assembly (20) comprises a first element (23) for receiving said end (22) and a second element (24) adapted to cooperate with said rear face (21, 25) of said piston (10), said elastically deformable module (32) being disposed between said first and second elements (23, 24).

4. Device according to claim 3, characterized in that said first and second elements (23, 24) are connected by a mechanical linkage with clearance (23a, 23c, 26–30).

5. Device according to claim 4, characterized in that said mechanical linkage comprises a rod (26) provided with a head (27) received with clearance in a housing (23a, 23c) of one (23) of said elements and fast (28–30) with the other element (24).

6. Device according to claim 1, characterized in that said elastically deformable module (32) is disposed between said rod (11) and its drive means (12).

7. Device according to claim 5, characterized in that said module (32) is formed by a stack of Belleville washers (31).

8. Device according to claim 7, characterized in that said Belleville washers (31) are disposed between said first and second elements (23, 24), around said rod (26).

9. Device according to claim 1, characterized in that said module is formed by a block of material which is elastically deformable in compression (F), in particular elastomer.

10. Device according to claim 1, characterized in that the constant of stiffness of said module (32) is sufficient for said module to be rigid during the phases of spraying of said product.

* * * * *